United States Patent [19]

Bhatia et al.

[11] Patent Number: 5,065,959
[45] Date of Patent: Nov. 19, 1991

[54] VIBRATION DAMPING AIRCRAFT ENGINE ATTACHMENT

[75] Inventors: Kumar G. Bhatia, Mercer Island; Walter E. Backus, Kent; Jack S. Hagelin, Seattle, all of Wash.

[73] Assignee: The Boeing Company, Seattle, Wash.

[21] Appl. No.: 439,318

[22] Filed: Nov. 21, 1989

[51] Int. Cl.$^5$ .............................. B64D 27/00
[52] U.S. Cl. ............................... 244/54; 248/554; 248/556
[58] Field of Search .................. 244/54, 53 R; 248/554-557

[56] References Cited

U.S. PATENT DOCUMENTS

| | | | |
|---|---|---|---|
| 1,516,295 | 11/1924 | Huntington . | |
| 2,261,954 | 11/1941 | Browne | 248/5 |
| 2,633,312 | 3/1953 | Hagger | 244/54 |
| 2,863,620 | 12/1958 | Vautier | 244/15 |
| 2,877,970 | 3/1959 | Albertine | 244/119 |
| 2,936,978 | 5/1960 | Laack | 248/555 |
| 3,487,888 | 1/1970 | Adams et al. | 181/33 |
| 3,490,556 | 1/1970 | Bennett et al. | 181/33 |
| 3,809,340 | 5/1974 | Dolgy et al. | 244/54 |
| 3,836,100 | 9/1974 | Von Haiden et al. | 244/54 |
| 4,044,973 | 8/1977 | Moorehead | 244/54 |
| 4,140,868 | 2/1979 | Tuttle | 174/42 |
| 4,147,029 | 4/1979 | Sargisson | 244/54 |
| 4,412,774 | 11/1983 | Legrand et al. | 244/54 |
| 4,571,936 | 2/1986 | Nash et al. | 244/54 |
| 4,603,821 | 8/1986 | White | 244/54 |
| 4,634,081 | 1/1987 | Chee | 244/54 |
| 4,725,019 | 2/1988 | White | 244/54 |
| 4,742,975 | 5/1988 | Packomoff | 244/54 |
| 4,821,980 | 4/1989 | Clausen et al. | 244/54 |
| 4,917,331 | 4/1990 | Hager et al. | 244/54 |

FOREIGN PATENT DOCUMENTS 1065727 9/1959 Fed. Rep. of Germany .
632017 12/1927 France .
734532 8/1955 United Kingdom .

Primary Examiner—Joseph F. Peters, Jr.
Assistant Examiner—Christopher P. Ellis
Attorney, Agent, or Firm—Elizabeth F. Harasek; B. A. Donahue

[57] ABSTRACT

Means for mounting an engine to an aircraft are provided which reduce the dynamic response of the airframe due to engine vibration. A mount comprises at least one strut extending between the engine and the airframe which is attached to the airframe by means of damping elements.

11 Claims, 7 Drawing Sheets

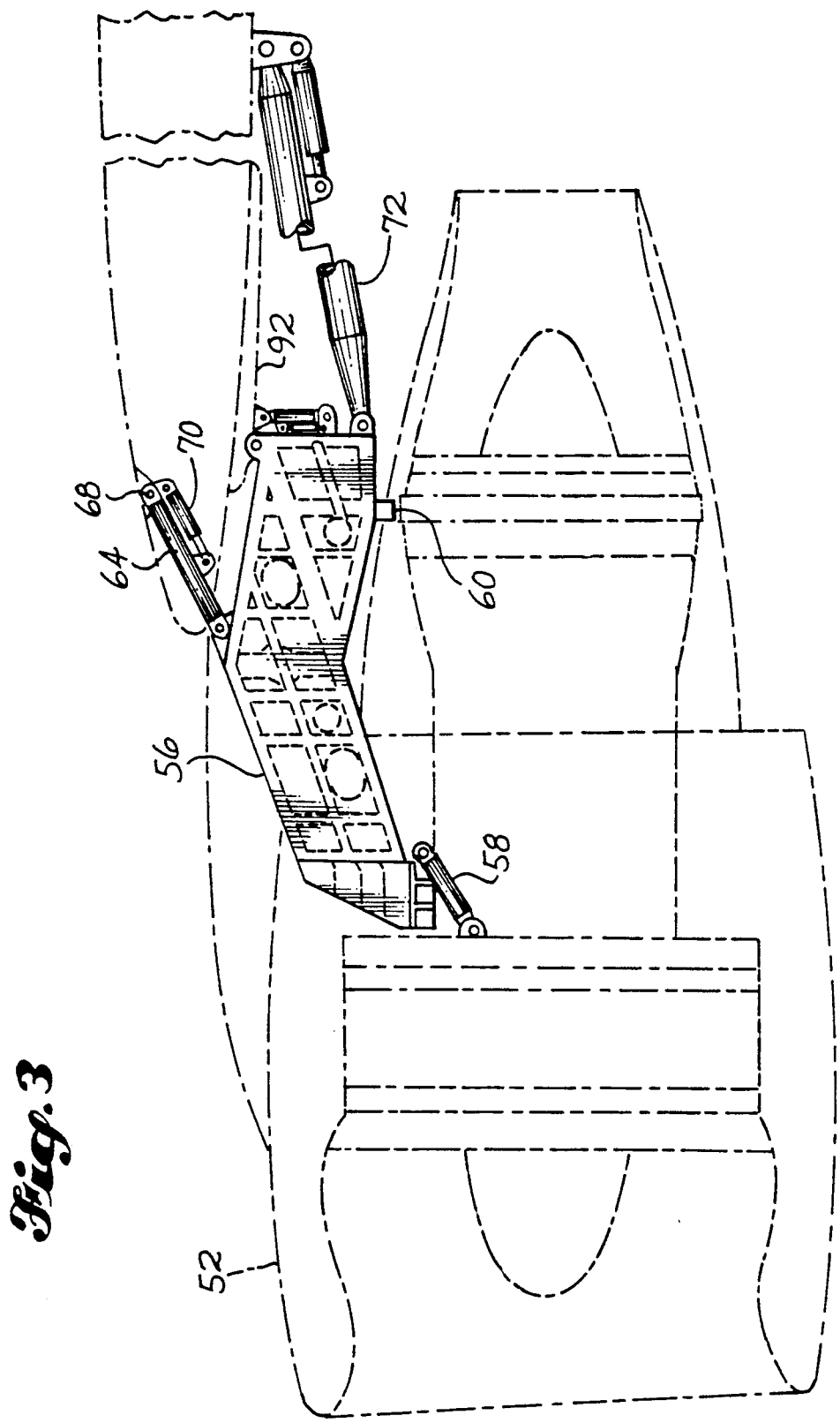

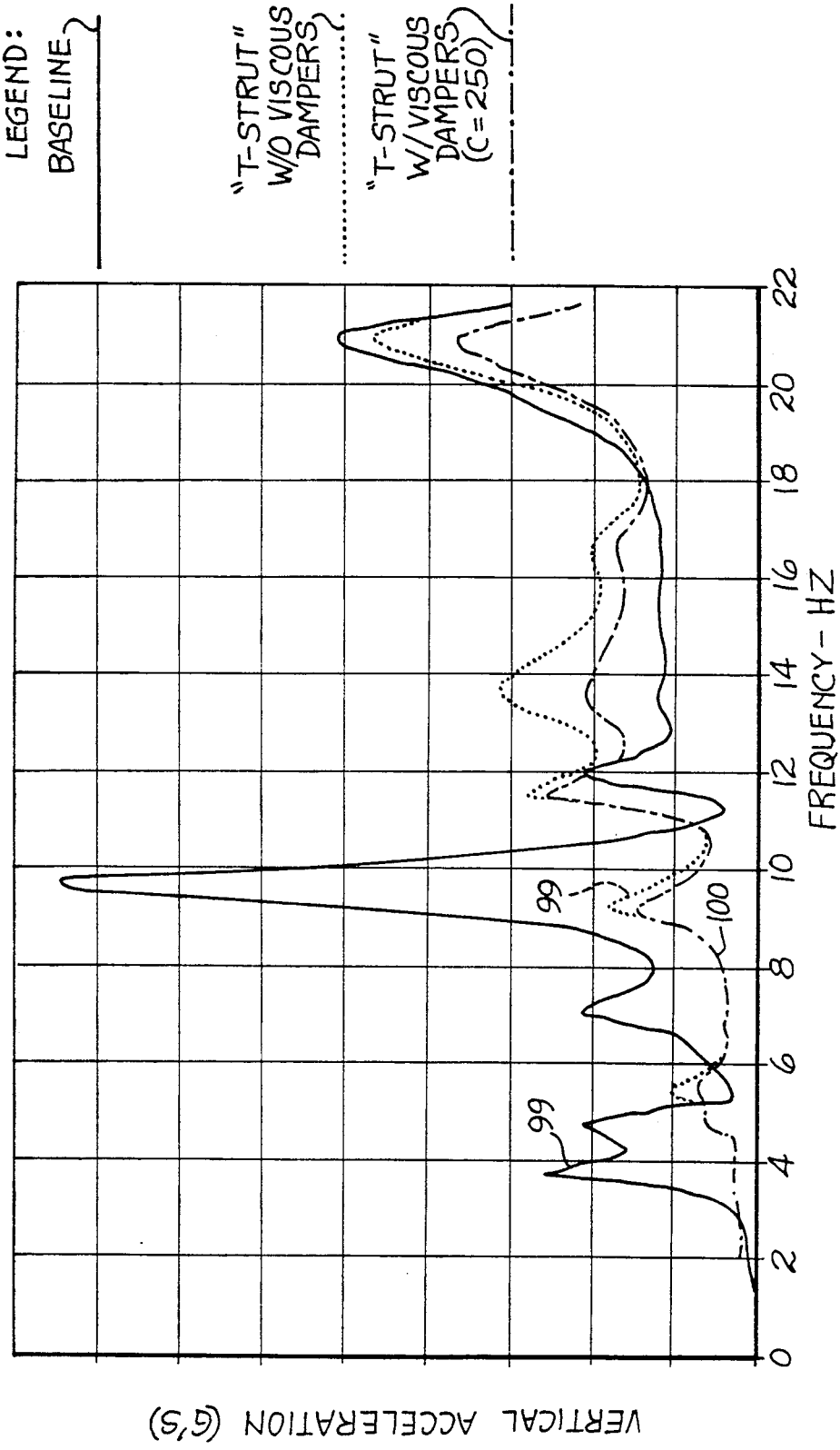

VIBRATION DAMPING AIRCRAFT ENGINE ATTACHMENT

BACKGROUND

This invention relates to a novel damped strut for attaching an engine to an aircraft. More particularly, the invention relates to a specially adapted engine mount wherein damping elements are located at the strut-airframe interface.

Certain modern unducted fan (UDF) jet engines have two sets of uncowled counter-rotating propeller blades mounted aft of the combustion chambers and turbines. These blades are large with wide chords and thin cross sections. Accordingly, they present a large target area and could be damaged by impact from solid objects. Modern cowled fan jets with very large cross-sections also present large targets for fan blade damage.

Rotating damaged blades at high speeds causes unbalanced forces in the engine which are transmitted to the airframe through the engine attachment structure. The intensity of the unbalance depends on the extent of the damage to the blades.

The flight deck crew or automatic systems ordinarily shut down a damaged engine to reduce the magnitude and duration of such unbalance vibration. However, if attempts to shut down are unsuccessful, the high dynamic unbalance loads might cause damage to the airframe, engine installation or aircraft control elements and impair the ability of the fight crew to perform critical tasks such as reading flight instruments.

Attempts have been made to deal with potentially large engine unbalances by adding elastomeric dampers at or near the location where an engine is mounted to the attachment strut and/or by strengthening selected airframe members. While these measures may have prevented structural damage to an aircraft due to severe unbalance, they did not provide a solution for the large vertical and lateral accelerations transmitted through the airframe and experienced by the crew and passengers.

Since UDF and large fan jet engine failures represent extreme cases of potential damage to an aircraft from engine vibration, this invention was made principally to solve UDF unbalance problems. However, the subject invention has general application to any engine-aircraft combination. It is useful for damping vibration from any engine with a rotating fan, turbine, or propeller such as unducted fan engines, turbofan engines, jet engines, turboprop engines, and piston powered propeller engines. Practice of this invention reduces vibration transmission to the airframe in all circumstances—from ordinary engine operating vibration to severe vibration caused by engine unbalance.

Accordingly, our invention provides a novel means for attaching engines, particularly UDF, helicopter or other large diameter fan engines, to an aircraft which means effectively reduce the adverse effect of vibration and large engine unbalances on the entire structure.

BRIEF SUMMARY

In accordance with a preferred embodiment, means comprising one or more attachment struts or pylons are provided which extend between an engine and the airframe of an aircraft. A plurality of spaced-apart damping elements are provided between the attachment strut(s) and the airframe, i.e., the fuselage or the wing. The damped attachment between the strut and airframe may be branched to optimize load carrying by the airframe, to provide fail safety, and to tune the response of the airframe to the engines under ordinary operating conditions. The incorporation of dampers between engine attachment struts and the airframe in accordance with this invention is particularly adapted to damp vibrations in all directions and reduce the dynamic response of the airframe. It is effective in damping severe vibration due to large engine unbalances, as well as normal operating vibration.

FIGURES

FIG. 3 shows a side sectional view of a wing mounted fan jet engine featuring dampers at strut box-wing attachment points.

FIGS. 5 and 6 are plots of calculated vertical and lateral accelerations, respectively, experienced within the cockpit of a twin UDF engine aircraft after loss of propeller blades.

DETAILED DESCRIPTION

Our invention will be better understood in terms of the detailed description of preferred embodiments thereof which follow.

Figure 1:
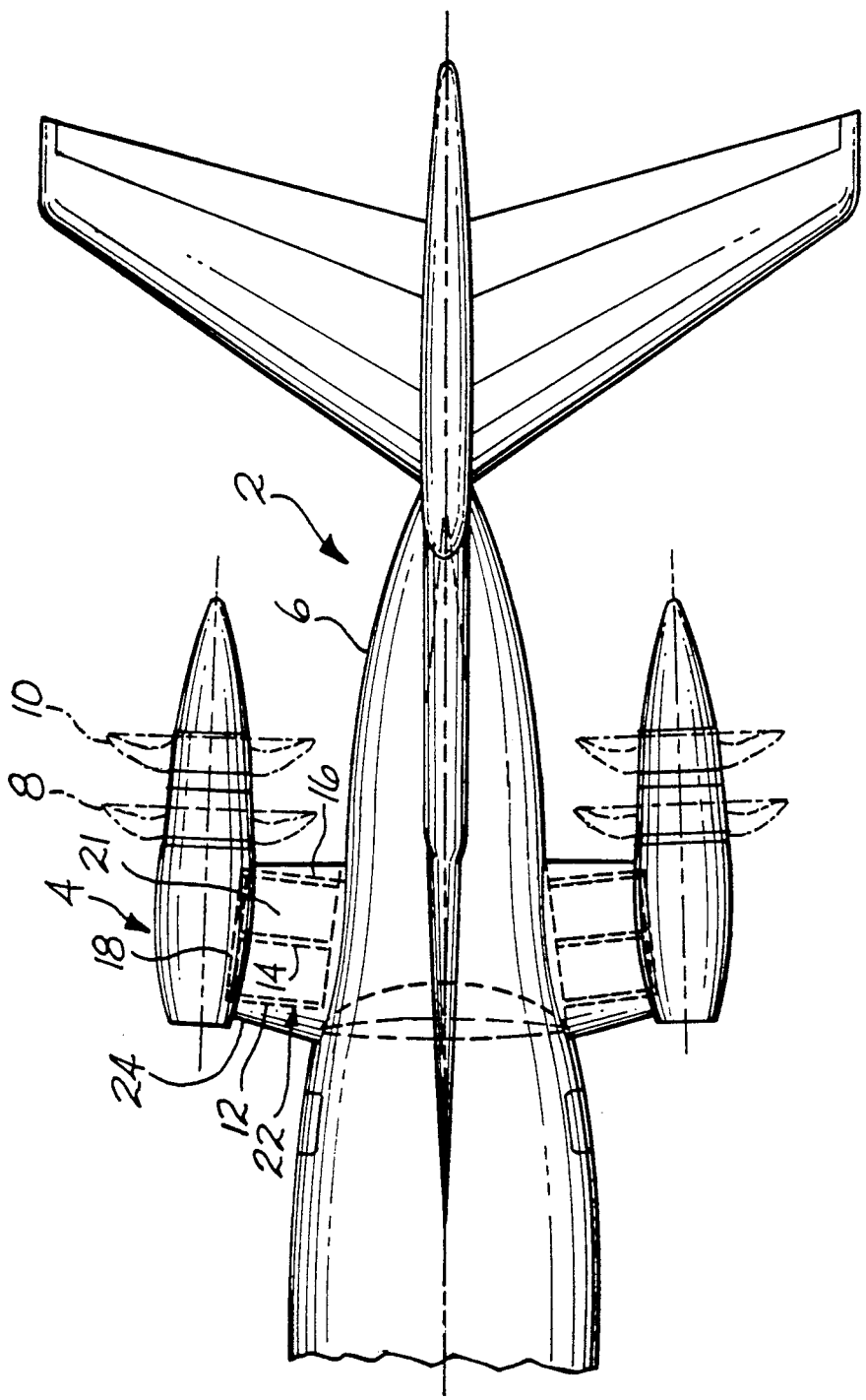
FIG. 1 is a top plan view of a twin engine aircraft with two aft mounted unducted fan engines.

FIG. 1 illustrates a top plan view of a tail section 2 of an airplane with an unducted fan engine 4 mounted on either side of the fuselage 6. Engines 4 and their mounts are substantially the same or mirror images of one another and the details will be shown and numbered accordingly.

Each engine has a first set of rapidly rotating propeller blades 8 and a second similar set 10 rotating in the opposite direction. These are the blades which, if damaged, can cause extreme vibration in the aircraft due to rotational unbalance. Forward attachment spar 12, mid attachment spar 14 and rear attachment spar 16, outboard closure rib 18, inboard closure rib 20 and upper and lower skin panels 21 are schematically shown and together form the attachment strut 22. Conventionally, dampers are included in the attachment between an engine and the outboard end of the strut mount. In the subject invention, dampers are provided between a fuselage 6 or wing (not shown in FIG. 1) and the inboard end of an attachment strut 22. In addition, the conventional dampers may also be included. Strut 22 may be concealed inside covering airfoil 24.

Figure 2:
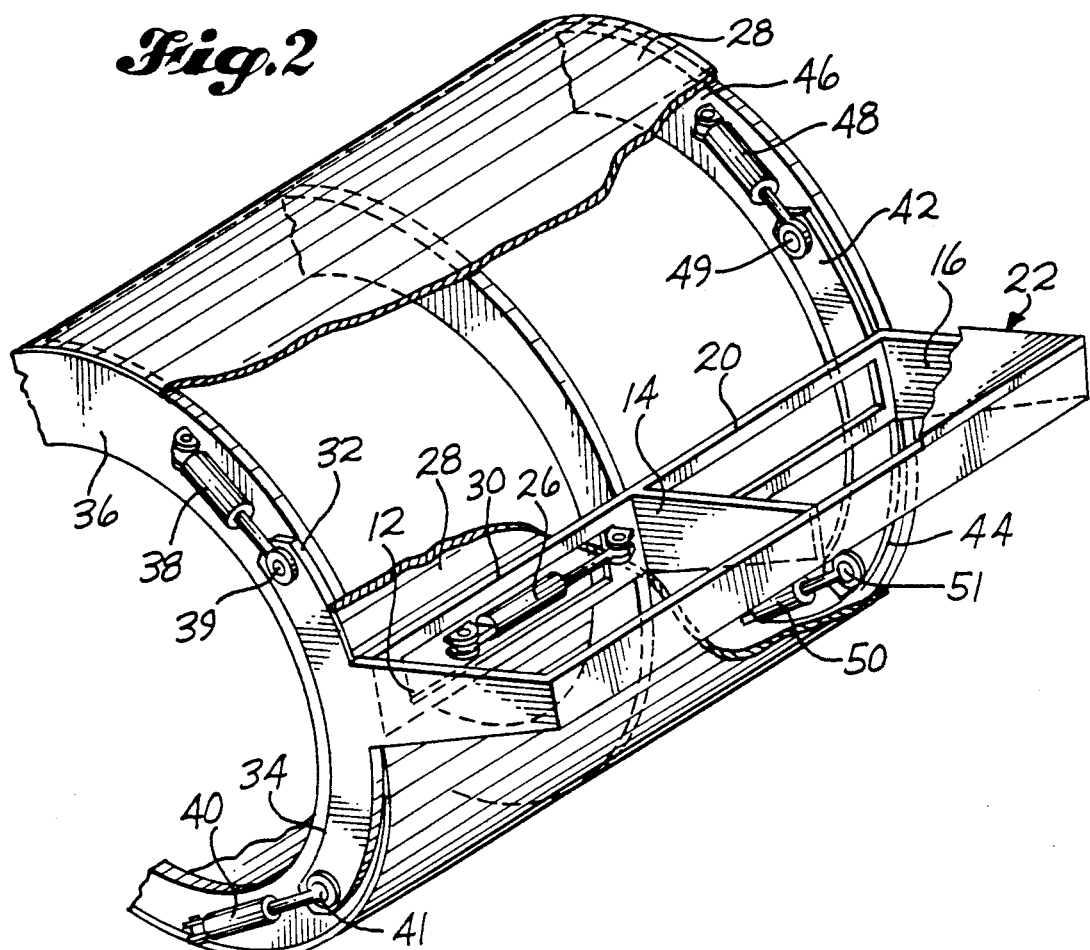
FIG. 2 is a schematic representation of an engine mount strut in accordance with the invention showing two branched end attachment spars which attach to fuselage frames, and a strut closure rib which attaches to the fuselage skin by means of damping elements.

FIG. 2 is a more detailed schematic representation of an engine mount in accordance with FIG. 1 incorporating a preferred embodiment of a damped strut-airplane engine attachment of this invention. The engine and details of its attachment to strut 22 are not shown. Generally, the attachment between the engine and strut may include dampers of the type shown in U.S. Pat. No. 4,044,973 also assigned to the Boeing Company.

Inboard closure rib 20 connects forward branched spar 12, unbranched mid spar 14 and aft branched spar 16. Closure rib 20 has thrust damping element 26 attaching it to fuselage skin 28. While one shock absorbing type damping element 26 is shown, more than one damping attachment may be made between the inboard closure rib and the airframe.

Forward spar 12 has an upper branch 32 and a lower branch 34 which are each attached to fuselage frame member 36 under fuselage skin 28 with viscous damping elements 38 and 40 elastomeric dampers 39 and 41, respectively, which react laterally and vertically directed loads.

Similarly, rear spar 16 has upper and lower branches 42 and 44 which are attached to fuselage frame member 46 under fuselage skin 28 with viscous damping elements 48 and 50 elastomeric dampers 49 and 51.

The branched ends of forward spar 12 and rear spar 16 function together to react the rolling moment. Since each two pronged branched spars is by itself capable of transmitting the lateral and vertical forces and the rolling moment, the combination of any two such branched spars, along with the thrust damping element(s), is capable of transmitting and damping six force-moment components from the strut into the airplane structure. Attachment struts are designed to carry static engine loads, provide fail safety and handle engine vibration. The number of branches and length of mounting spars and struts can be varied in accordance with our invention to best suit a specific damped strut-airframe attachment installation.

Conventional design practice is that the damping elements be located at or as close to the source of vibration, i.e., the engine, as possible. Accordingly, it was believed that locating damping elements on the airplane side of an attachment strut would not be an effective means of damping vibrations caused by an engine. Furthermore, it was thought that placing damping elements at or near the inboard end of such a strut would not be effective because vibration from the engine at the outboard end would be amplified through the strut. We have found instead that the subject engine attachment, damped at the airplane-engine strut attachment, effectively damps engine vibration, even extreme vibration created by engine unbalance.

There are many well known damping elements and devices used in aircraft. Each such damping element has certain stiffness and damping characteristics suitable for a specific application. The damping elements can be elastomeric dampers made of synthetic or natural rubber, for example. They may also be viscous dampers, hydraulic dampers, metal mesh resilient dampers, pneumatic dampers, combination damper elements such as hydraulic and pneumatic shock absorbers, or any combination of these or other equivalent damping means. Conventional aircraft damper mounts comprise a metal housing containing stiff rubber pads or resilient metal screens sized and shaped to deform under pressure and return to their original shapes and positions when the pressure is relieved. These damping elements may be integrated into an active vibration control system.

Our invention is also particularly well adapted to active suspension of engines by selective control vibration damping elements. In a preferred embodiment, the amount of vibration at a desired location or locations would be measured by conventional means, the information would be processed by a computer, and the damping member would be controlled to optimally damp the measured vibration. In particular, the response of hydraulic dampers such as 38, 40, 48 and 50 of FIG. 2 could be stiffened or relaxed by control of hydraulic fluid pressure therein in response to measured vibration.

Figure 4:
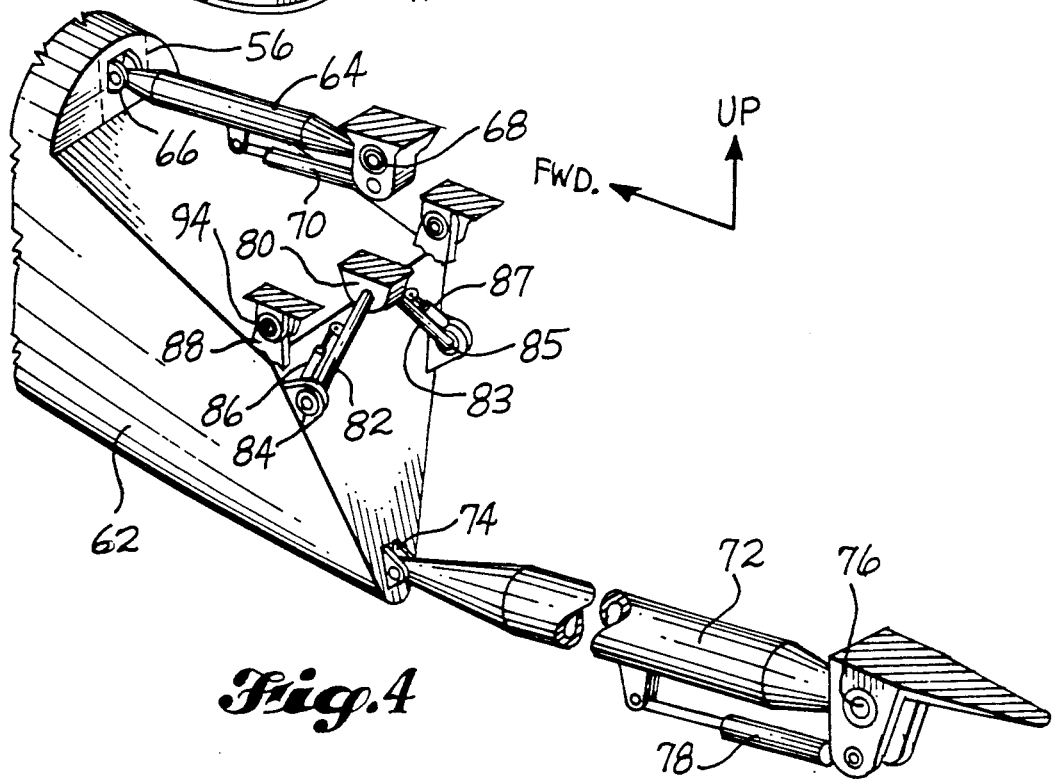
FIG. 4 is a perspective schematic view of an engine attachment like that of FIG. 3.

Variations of the fuselage engine mount arrangement of FIGS. 1 and 2 would be apparent to a person skilled in the art. For example, FIGS. 3 and 4 show a mount in accordance with our invention which is damped between the attachment strut and wing of an airplane.

FIG. 3 shows a schematic sectional side view of a fan jet engine 52 mounted to wing 54 of an aircraft through torque or strut box 56. Strut box 56 is attached to engine 52 by forward engine mount 58 and aft engine mount 60. As seen more clearly in FIG. 4, strut box 56 inside fairing 62 is secured to the wing by a number of damped attachment elements. Upper link 64 is attached to strut 56 at hinge 66. The other end is attached to the wing box by elastomeric damper 68. Axial damper 70 acts in parallel with damper 68. Similarly, diagonal brace 72 is attached to strut 56 at hinge 74. The other end is attached to the wing by elastomeric damper 76. Axial damper 78 acts in parallel with damper 76. Side links 82 and 83 angle from mid attachment fitting 80 to elastomeric dampers 84 and 85. Axial dampers 86 and 87 act in parallel with elastomeric dampers 84 and 85. Mid spar fittings 88 and 90 attach strut 56 to the wing by means of elastomeric dampers 94 and 96. Fuse pins may be located in the appropriate damping elements, if desired.

Spacing between the mid spar attachments 88 and 90 side elastomeric dampers 84 and 85 provides vibration damping and strength characteristics like the branched ends of the fuselage mounted engine attachment described above. For example, the damped upper link and diagonal brace dampers 68 and 76 are spaced apart vertically and the midspar fittings 88 and 90 are spaced apart laterally.

A finite element analysis model for engine unbalance vibration was run on a Boeing ATLAS computer program to determine damping characteristics of the branched strut mounting arrangements shown in FIGS. 1 and 2 for a Boeing 7J7 Model 789-177E aircraft. Weights and centers of gravity were assigned for the blades of a prototype General Electric UDF engine and the analysis assumed engine unbalance created by two blades in each set of counter rotating blades missing. Structural damping coefficients for the engines, the aluminum structure of the aircraft and the mounting dampers were assigned based on history with similar aircraft.

Figure 6:
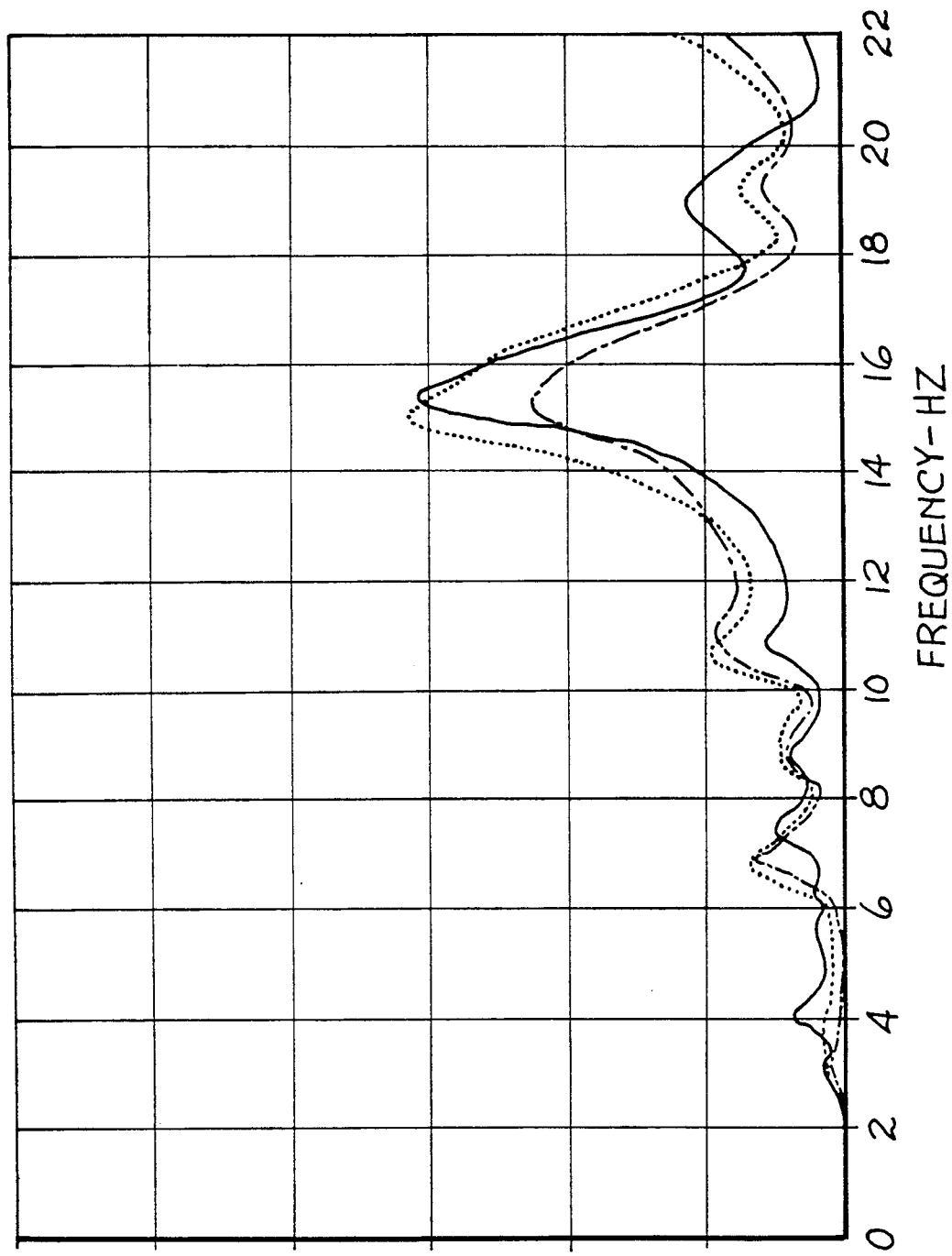
Figure 7:
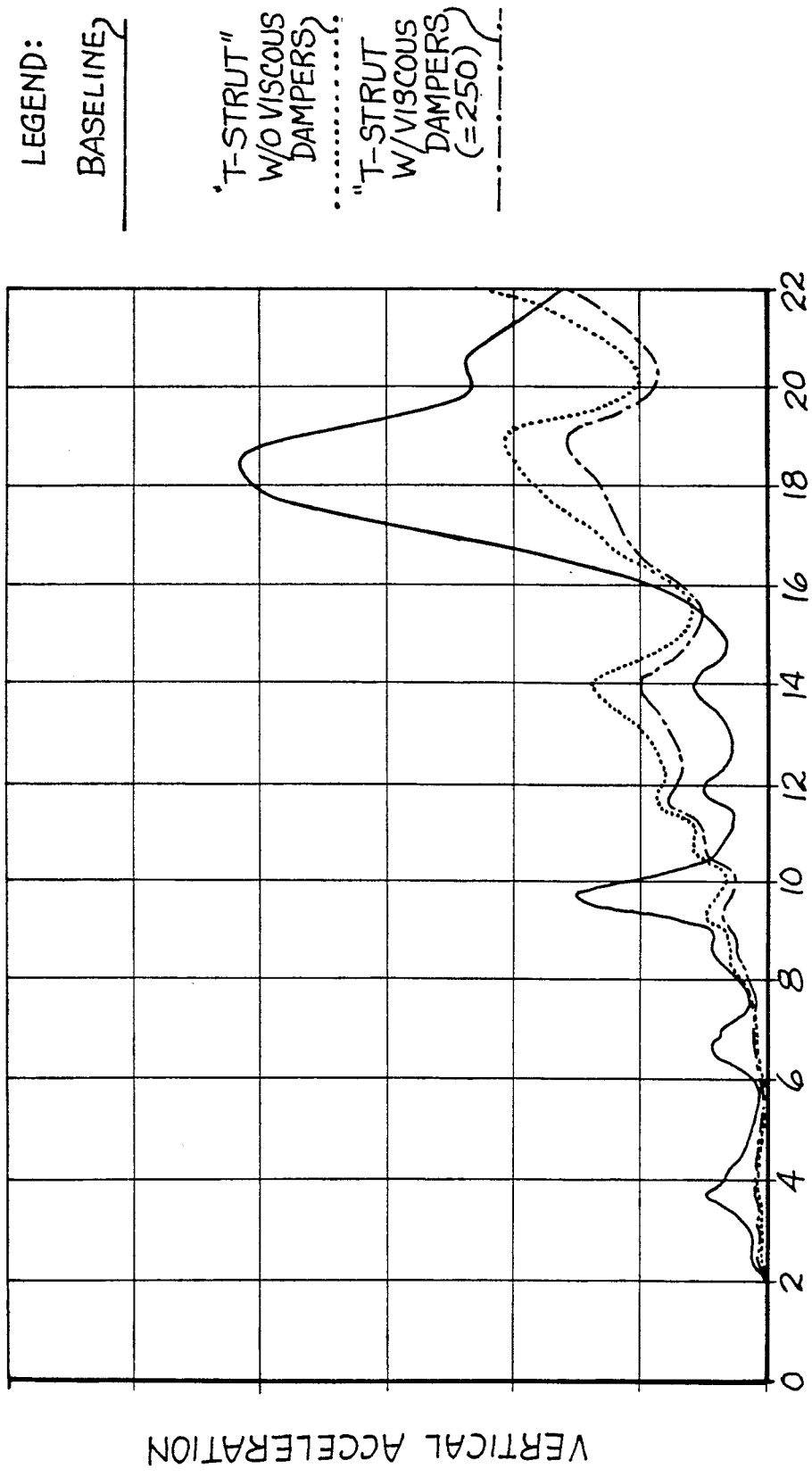
FIGS. 7 and 8 are plots of calculated vertical and lateral accelerations, respectively, experienced within the aft cabin of a twin UDF engine aircraft after loss of propeller blades.
Figure 8:
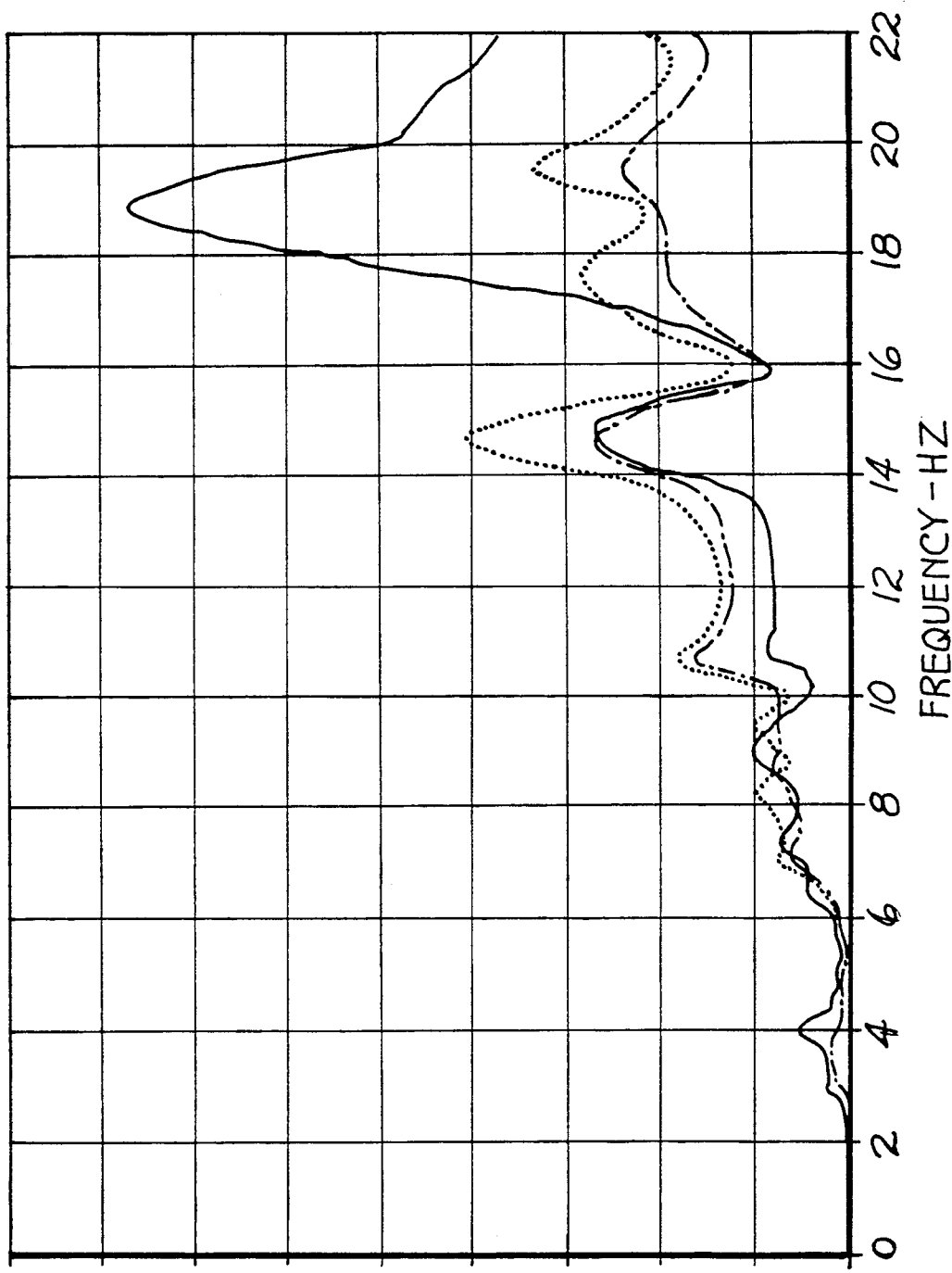

FIGS. 5 and 6 are normalized plots of the finite element analysis results in the cockpit for vertical and lateral accelerations, respectively. The results shown are for steady state rotating frequencies between 1 and 21.5 Herz. The baseline is the calculated accelerations of a conventional strut and engine mounts with dampers located between the strut and the engine. Calculated results for a branched attachment (T-strut) having elastomeric dampers show a reduction in the cockpit and cabin accelerations both vertically and laterally. Including viscous dampers in addition to the elastomeric dampers further improves damping characteristics of the T-struts. FIGS. 7 and 8 report like results for the vertical and lateral accelerations experienced in the passenger cabin.

There are many advantages to the use of the subject damped strut attachment. For example, the dampers are located away from the hot engine and the cooler location permits use of a wide variety of damper designs and materials. The dampers at the branched ends of the struts are located away from the engine cowling; hence there is more space available and they are easy to inspect and service. Dampers can be arranged such that they are not in a direct structural load path but parallel to it. The number and length of spar branches from the center planes of an attachment strut can be designed to optimize vibration damping. Vibration isolation brought about by the subject damped branched strut mounting arrangement will reduce vibration and noise in the cockpit and cabin.

While our invention has been described in terms of specific embodiments thereof, clearly other forms may be readily adapted by one skilled in the art. Accordingly, the scope of our invention is to be limited only in accordance with the following claims.

We claim:

1. Means for mounting an engine to the airframe of an aircraft which means are particularly adapted to reduce the dynamic response of the airframe due to engine vibration, said means comprising at least two struts, said struts comprising at least two spars and a closure rib extending therebetween, said struts extending between said engine and the airframe of said aircraft, and one or more dampers connecting said spars and airframe, and a damper connecting said closure rib and said airframe, said means being particularly adapted to damp vibration in all directions and reduce the dynamic response of the airframe to engine vibration.

2. Means for mounting an engine to the fuselage of an aircraft which means are particularly adapted to reduce the dynamic response of the airframe due to engine vibration, said means comprising at least two struts comprised of at least two spars and a closure rib extending therebetween, each said spar being branched at the end adjacent said airframe, said closure rib and each said branch having a damping element connecting itself and the fuselage.

3. The means of claim 1 where the dampers comprise one or more selected from the group consisting of natural or synthetic rubber or resilient metal screen engine mounts and pneumatic or hydraulic shock absorbers.

4. The means of claim 2 where the dampers comprise one or more selected from the group consisting of natural or synthetic rubber or resilient metal screen engine mounts and pneumatic or hydraulic shock absorbers.

5. The means of claim 1 where the engine is one or more selected from the group consisting of unducted fan engines, turbofan engines, jet engines, turboprop engines, and piston powered propeller engines.

6. The means of claim 2 where the engine is one or more selected from the group consisting of unducted fan engines, turbofan engines, jet engines, turboprop engines, and piston powered propeller engines.

7. The means of claim 1 where the strut comprises two branched end spars and an unbranched mid spar.

8. The means of claim 2 where the strut comprises two branched end spars and an unbranched mid spar.

9. The means of claim 1 where the engine is mounted to the wing.

10. The means of claim 1 where the engine is mounted to the fuselage.

11. Means for mounting an engine to the fuselage of an aircraft which means are particularly adapted to reduce the dynamic response of the airframe due to engine vibration, said means comprising at least two struts, said struts comprising at least two spars and a closure rib extending therebetween; one or more dampers connecting said spars to said airframe and a damper connecting said closure rib to said airframe; the stiffness of a said dampers being controlled in response to sensed vibration of said engine.

* * * * *